United States Patent [19]

Greenwood

[11] Patent Number: 5,090,951
[45] Date of Patent: Feb. 25, 1992

[54] HYDRAULIC CONTROL CIRCUITS FOR CONTINUOUSLY-VARIABLE-RATIO TRANSMISSIONS

[75] Inventor: Christopher J. Greenwood, Preston, England

[73] Assignee: Torotrak (Development) Limited, England

[21] Appl. No.: 655,392

[22] PCT Filed: Aug. 15, 1989

[86] PCT No.: PCT/GB89/00937
§ 371 Date: Feb. 13, 1991
§ 102(e) Date: Feb. 13, 1991

[87] PCT Pub. No.: WO90/02277
PCT Pub. Date: Mar. 8, 1990

[30] Foreign Application Priority Data
Aug. 16, 1988 [GB] United Kingdom ............... 8819430

[51] Int. Cl.[5] .............................................. F16H 37/06
[52] U.S. Cl. ..................................... 475/216; 74/200; 91/409
[58] Field of Search ................ 74/200; 192/3.55, 3.57; 475/216; 91/51, 408, 409

[56] References Cited

U.S. PATENT DOCUMENTS 4,355,547 10/1982 Poole et al. ........................ 74/200

FOREIGN PATENT DOCUMENTS 0078125 5/1983 European Pat. Off. .
0133330 2/1985 European Pat. Off. .
2023753 1/1980 United Kingdom .
2032540 5/1980 United Kingdom .

Primary Examiner—Edward K. Look
Assistant Examiner—F. Daniel Lopez
Attorney, Agent, or Firm—Davis, Bujold & Streck

[57] ABSTRACT

A hydraulic control valve for a continuously-variable-ratio transmission (CVT), particularly one of the toroidal race rolling traction type. The transmission includes hydraulically-operated clutches (25,26) whose capacity to transmit torque varies with the operating pressure supplied to them. The transmitted ratio is related to the position of a hydraulic ram (35), which when it overshoots its normal stroke creates a pressure rise upstream of it in the circuit. This pressure rise first resists further overshoot, and then causes a reduction in the clutch operating pressure. Ram position is controlled by valves (56,57) which are located downstream of the ram, and which are themselves sensitive (via 58) to feedback from upstream circuit pressure: when that pressure rises, the valves open so as to depress the downstream circuit pressure by which the clutches are operated (via 68). A double-acting ram is shown, controlled by a circuit comprising two parallel hydraulic lines (42,54: 43,55) associated respectively with the opposite ends (36,37) of the ram, each line being controlled by a separate downstream control valve. The pressure feedback to the control valves and the operating pressure for the clutches are taken from cross-connections (48,60) between the two lines, so that each such pressure always has the higher of the values existing in the two lines at each end of the cross-connection.

8 Claims, 1 Drawing Sheet

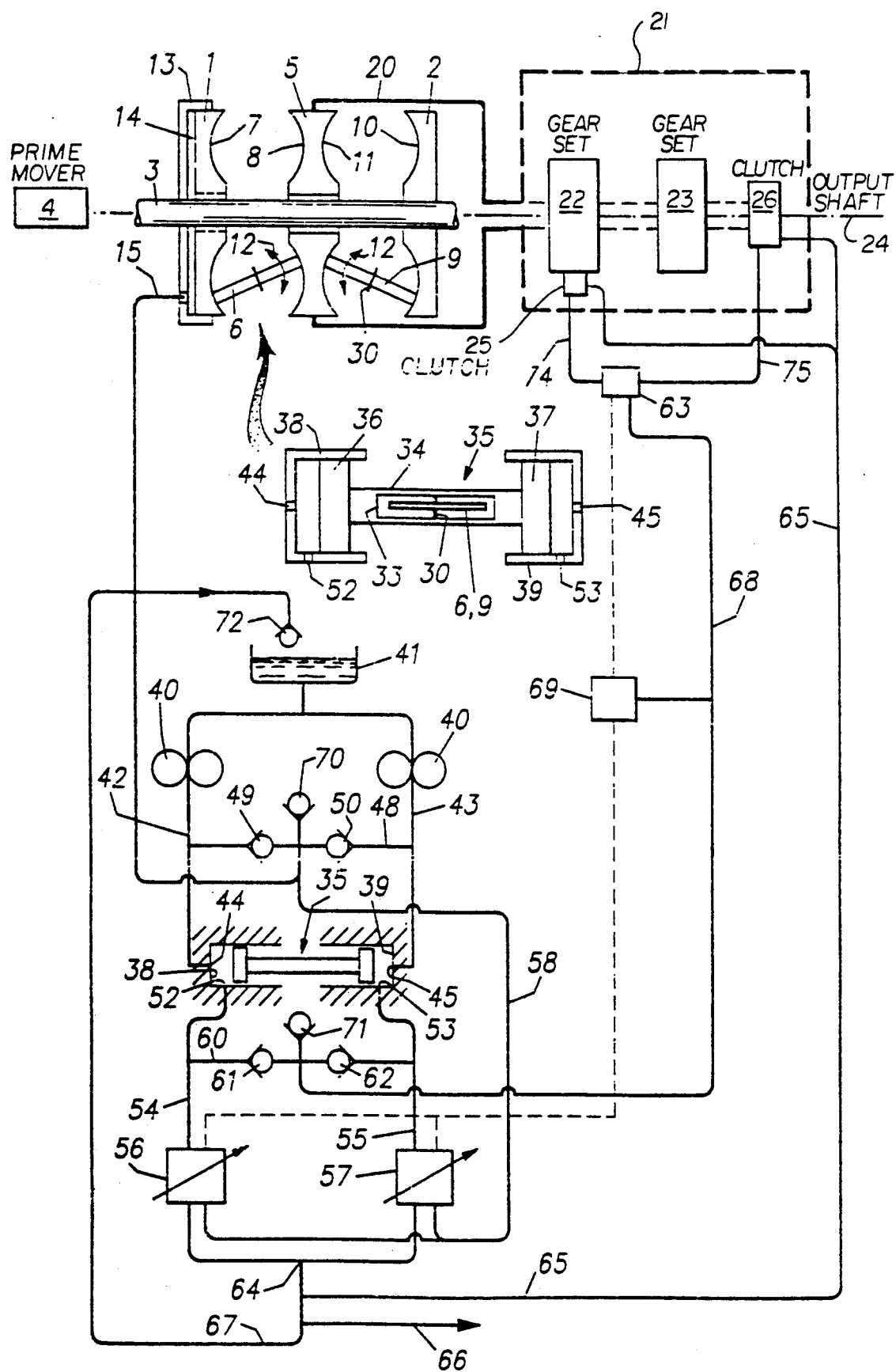

HYDRAULIC CONTROL CIRCUITS FOR CONTINUOUSLY-VARIABLE-RATIO TRANSMISSIONS

This invention relates to hydraulic control circuits for CVT's, that is to say for continuously-variable-ratio transmissions. It relates especially to automotive CVT's, and in particular to such CVT's of the known toroidal-race rolling-traction type. Hydraulically controlled transmissions of the latter type, of which examples are to be found in patent specifications GB-C-2023753, EP-B-0078125 and U.S. Pat. No. 4,662,248, are now well known in the art.

The control mechanisms of all efficient automotive CVT's have to include features to protect the transmission against the consequences of abuse and/or overload. For a CVT of the toroidal race type, one likely consequence of certain types of abuse or overload is that the rollers may tend to exceed the normal span of angular movement through which they move in order to change the transmitted ratio, and in so exceeding to run off the edges of the part-toroidal races on the input and output discs of the variator, that is to say the ratio-varying unit. In a CVT where the primary function of the drive train is the transmission of power from engine to wheels, abuse or overload interrupts that function. An overriding demand at the wheels is a typical example of such an overload, and may be created at the vehicle brakes, as in an emergency stop, or at the interface between the wheels and the ground as when traction is lost or regained during wheel spin.

It is well known in the art to incorporate in such CVT's a hydraulic end-stop mechanism which operates so as to resist further angular movement of the roller mountings, whenever they approach the extremes of their permitted range of angular movement. Such mechanisms are incorporated in all three of the prior patent specifications quoted by number in the first paragraph. However in the prior art generally, and particularly in the three specifications referred to, it has been customary to create the end-stop effect by a series of steps that may be summarised as follows. First the hydraulic ram piston, to which the roller carriage is connected and by which it is angularly moved, overshoots one extreme of its range of normal movement. Second, that overshoot gives rise to a variation of hydraulic pressure somewhere within the operating circuit of the CVT. Third, that pressure variation causes movement of a valve-type component within the CVT—in embodiments shown in EP-B-0078125, U.S. Pat. No. 4,662,248 and GB-C-2023753 these components are the spools of valves 22 and 23 and spool 161 respectively. Fourth, that moving part either bears directly against the piston (as with spool 161) or causes a pressure rise in a chamber of the ram cylinder (as with valves 22, 23) to oppose further movement of the piston. This process, although it has proved reasonably effective in practice, is necessarily more indirect and less immediate in operation than may be desirable to respond to the sudden changes in roller angle and/or circuit pressures that may result from overload or abuse.

One aim of the present invention is to provide a potentially quicker and more direct change in hydraulic pressure within a ram cylinder, to oppose the overshoot of the piston in such abuse or overload conditions. Another general aim of the invention, in a CVT including a clutch or other mechanism capable of acting as a safety link in the mechanical linkage between the variator and the final output of the transmission, is to provide the facility for using the increased ram chamber pressure to modulate the degree of engagement of such a clutch. In a hydraulically-operated CVT of the toroidal-race, rolling traction type, another aim of the invention is to reflect any increase in ram cylinder pressure in a higher pressure in the hydraulic mechanism which exerts an end load upon the variator so as to maintain continuous traction between the input disc and the rollers, and between the rollers and the output disc.

The invention is defined by the claims, the contents of which are to be read as part of the disclosure of this specification, and the invention will now be described, by way of example, with reference to the accompanying schematic drawing showing a hydraulic circuit for a CVT of the toroidal-race, rolling traction type, and some of the mechanical components of the transmission also.

A two-regime continuously-variable-ratio transmission of the toroidal-race, rolling-traction type, for use in a vehicle and of a kind well known in the art and described in detail in patent specifications GB-C-2023753 and GB-A-1078791 for example, includes a variator, that is to say a ratio-varying component of variable orientation, comprising two input discs 1, 2 which both rotate with an input shaft 3 driven by a prime mover 4. Disc 2 is fixed to shaft 3, and disc 1 is splined to the shaft so that the shaft and disc have freedom for limited relative movement in an axial direction. A double-faced output disc 5 lies between discs 1 and 2 and a set of rollers (of which one, 6, is shown) makes rolling contact between part-toroidal races 7 and 8 formed on discs 1 and 5 respectively. Another set of rollers (of which only one, 9, is shown) makes similar rolling contact between part-toroidal races 10, 11 formed respectively on disc 2 and on the opposite face of disc 5. By means well known in the art (which are essentially mechanical in GB-C-2023753 and GB-A-1078791, but are mainly hydraulic in many other prior publications in the art of which U.S. Pat. No. 4,662,248 is an example), the two sets of rollers 6 and 9 are controlled so that the rollers of the two sets always contact the two races 7 and 10 of input discs 1 and 2 at a first and common radius, and contact the two races 8 and 11 of the output disc 5 at a common second radius. By tilting both sets of rollers in the sense indicated by arrows 12 so as to vary their radii of contact with the input and output discs, in a manner which is well known in the art, the ratio between the angular velocities of the output and input discs is varied. In addition to its function as an input member of the variator, disc 1 also constitutes a piston movable axially within a cylindrical housing 13, and the chamber 14 is in communication by way of a conduit 15 with a pressurized source of fluid which acts on the left-hand face of disc 1 to exert the end load to generate the necessary contacting forces between rollers 6 and 9 and discs 1, 2 and 5 to transmit drive.

A bell-shaped output member 20 connects disc 5 to a component within an epicyclic combination which is indicated generally at 21 and which in this example comprises two interconnected epicyclic gear sets 22 and 23. The output shaft 24 of this combination constitutes the final output of the transmission as a whole, and in addition to the member 20 the input shaft 3 of the variator provides a further input to combination 21. The combination 21 also includes two engageable components in the form of clutches 25 and 26, operable respectively to lock one component of epicyclic 22 and to connect shaft 24 directly to an extension of output member 20 when desired. In one regime of operation of the transmission, usually known as low regime, one of the clutches (say 25) will be engaged and the other disengaged, and by tilting rollers 6, 9 from one extreme of the their angular movement to the other, while prime mover 4 rotates at a constant speed, output member 24 will change speed continuously. At the beginning it will be rotating at its maximum reverse speed. As the tilting of the rollers progresses that speed will fall to zero, after which the direction will reverse and shaft 24 will gather speed in a forward direction, reaching a low level of forward speed when the rollers reach the end of their range of movement. If the engagement of clutches 25, 26 is now reversed, if the gear ratios within combination 21 are arranged so that the change (known in the art as a "synchronous change") causes no instantaneous change of ratio, and if the rollers 6, 9 are then tilted back to the original extreme of their movement, output shaft 24 will progressively gather speed so that when the rollers 6, 9 are back in their original extreme setting the shaft 24 is rotating at maximum forward speed.

As the inset to the drawing shows, a first of the rollers 6, 9 is mounted on an axle 30 mounted in a cavity 33 mounted in the shaft 34 of a double-acting piston 35 formed with opposed piston heads 36, 37 which slide under hydraulic load within coaxial cylindrical caps 38, 39 and are free to rotate about the axis of shaft 34. A single headed version of the same piston, with opposite faces of that single head both exposed to fluid, would also be possible. Inlets 44, 45 and outlets 52, 53 for hydraulic fluid are formed in the end and side walls of caps 38, 39 respectively, and by means which are not shown but which are well known in the art (see U.S. Pat. No. 4,524,641, for example), the pressures in the corresponding hydraulic cylinders of the remaining rollers may be related to those in caps 38, 39 so that all the rollers take up the same orientation. It is also well known in the art (as explained in detail in GB-A-979062, for example) that by mounting the first roller within such caps and aligning the axes of the caps so that they are substantially tangential to the centre circle of the imaginary toruses of which the races 7, 8 and 10, 11 form part, but with a small inclination known as the "camber" or "caster" angle, then by appropriate control of the axial forces exerted on the piston 35, that piston can be caused to take up axial positions which dictate any desired angular setting of the first roller, and with it all the other rollers 6 and 9, relative to the discs 1, 2 and 5.

According to the present invention, a hydraulic control circuit for such a transmission comprises an oil pump 40 delivering hydraulic fluid from a sump 41 at equal rates of flow to left-hand and right-hand upstream flow lines 42 and 43. These lines deliver the fluid respectively to the inlets 44 and 45 of two cylinders 38 and 39 housing a piston 35 as shown in the inset. A cross-connection 48 between lines 42 and 43 communicates by way of non-return valves 49 and 50 and conduit 15 with the end load mechanism of the transmission, that is to say the chamber 14, so that chamber 14 is always fed with fluid at a pressure equal to the higher of the two pressures in lines 42 and 43.

Outlets 52 and 53 from caps 38 and 39 lead by way of downstream left-hand and right-hand lines 54 and 55 to the inlets of two electro-hydraulic pressure control valves 56 and 57 which are also regulated by pressure feedback, supplied by way of line 58, and indicative of the same hydraulic pressure that is fed to chamber 14. A cross-connection 60 between left-hand and right-hand lines 54 and 55 communicates by way of non-return valves 61 and 62, a connection 68 and a switching device 63 and thence, by way of lines 74 and 75 respectively with the operating mechanism of clutches 25 and 26. According to the setting of device 63, when the CVT is in the "neutral" or "park" mode operating fluid will be supplied to neither of clutches 25, 26. When the CVT is in a driving mode, however, operating fluid at the higher of the two pressures existing in lines 54 and 55 may therefore be supplied to one of the clutches 25 or 26, to engage that clutch and with it either "low" or "high" regime. Downstream of the outlets of control valves 56 and 57, the left and right hand fluid lines combine at 64, after which a connection 65 is operable to conduct fluid at low pressure but high flow rate to the clutches 25, 26 to fill them, a connection 66 provides fluid for general lubrication of the transmission, and the onward line 67 returns to the sump 41 by way of a low-pressure blow-off valve 72 which safeguards the constant supply of lubrication fluid at 66. Device 63 is under the control of the central electronic control mechanism 69 of the circuit. Typically, control mechanism 69 will operate so as to receive information from the driver of the vehicle—e.g. position of throttle pedal, selection of forward, neutral and reverse (FNR), etc.-—and information from speed sensors (not shown) to determine when regime changes should be made. From pedal position and speed information it will control valves 56 and 57, and from driver demand (FNR) and speed information the mechanism 60 will control device 63 so as to engage or disengage clutches 25 and 26. A pressure relief valve 70 limits the maximum pressure that can be applied to ram 35, and indeed the highest pressure that can exist anywhere in the circuit. Pressure relief valve 71 limits the pressure that can exist in line 68, and will be set to open at a lower valve than valve 70, for a reason that will be explained.

In normal operation of the transmission the force exerted upon piston 35, and therefore the angular settings of the roller which it carries and thus of the other rollers also, is determined by control signals fed from mechanism 69 to valves 56, 57 which respond by controlling the pressure difference across the left-hand and right-hand halves of the circuit. At any moment during normal operation of the transmission the signals from 69 will typically cause one of these valves to be fully open, and the other partially closed. It will be seen from the inset to the Figure that while the inlets 44, 45 to cylinder caps 38, 39 are located at or close to the cylinder end walls, the outlets 52, 53 are located at a distance from those walls. The axial spacing between outlets 52 and 53 represents the full normal stroke of piston 35, corresponding to the angular difference between the settings of the rollers 6, 9 at their two extreme positions of tilt. Therefore if piston heads 36, 37 tend to overshoot ports 52, 53 respectively, the rollers are in danger of running off the edges of races 7, 8 and 10, 11. However if piston 35 tends to exceed its permitted stroke, piston head 36 or 37 restricts the outlet of its associated chamber so that the pressure within that chamber rises up to a limit set by relief valve 70. This has two important consequences for a transmission of the toroidal-race, rolling traction type. Firstly the raised pressure effectively resists further overshoot of the piston 35, and thus further tilting of the rollers. Secondly that raised pressure is communicated, by way of cross-connection 48 and conduit 15, to the end load chamber 14, so increasing the end load and maintaining a sufficient reaction between discs and rollers to continue the transmission of traction in the exceptional conditions, resulting from overload and/or abuse, that have given rise to the overshoot of piston 35.

While it is desirable that traction should not suddenly fail and should therefore initially be maintained in overload/abuse conditions, it is also important that the raised end load and consequent higher forces of reaction between discs and rollers should not overstress those parts. The higher forces should therefore be of brief duration. The high pressure feedback to control valves 56, 57 by way of line 58 is arranged so as to achieve this. When piston 35 starts to restrict one of the outlets 52 or 53, the effect of the enhanced feedback pressure in line 58 upon whichever of the control valves 56, 57 is then exercising high pressure control within the circuit is to open that valve and so reduce the pressure in the line including that valve. That reduced pressure then passes by way of switching device 63 to whichever of clutches 25 or 26 is engaged. The capacity of that clutch will therefore be reduced. Since the variator can only be put under load by a torque transmitted across whichever regime clutch (25 or 26) is engaged, a continuously applied overload (resulting in a high-pressure feedback signal in line 58) will in general cause the pressure at the engaged clutch to reduce until clutch slip occurs.

The above sequence of steps may be illustrated by an example. Assume that valve 56 is working under direction from mechanism 69 and is therefore partially closed, that valve 57 is therefore fully open, and that piston 35 has overshot the right-hand end of its normal stroke so that outlet 53 is partially or even fully restricted. While the pressures in the working upstream and downstream lines 42 and 54 are therefore substantially equal, as normal, pressure in upstream line 43 rises to a valve above that in line 42. The pressure in line 43 is therefore communicated by way of cross-connection 48, valve 50 and line 58 with the feedback side of working valve 56. The inequality of pressures across valve 56 causes it to open further so that the pressure in line 54 falls. That lower pressure then reaches the switching device 63 by way of cross-connection 60, non-return valve 61 and line 58.

Once clutch slip has started, the variator and that clutch will operate in unison to maintain a torque across the variator equal to the value demanded by the control valve (56 or 57) operative upon the downstream line (54 or 55) which remains in circuit with pressure source 40. This situation will continue until the clutch stops slipping, when the piston 35 no longer overshoots, so that both of outlets 52 and 53 from chambers 38 and 39 are uncovered again and normal operation resumes.

Valve 70 limits the maximum pressure fed to device 63, and is set to a lower valve than valve 71 to avoid the possibility that while an overshoot condition persists in the ram, the balance of pressures on the working control valve (56 or 57) could change so that the upstream pressure (in line 54 or 55) exceeded the feedback pressure, thus triggering the closure of the working valve.

While item 40 has been described and illustrated as if it were a single but twin gang oil pump, delivering fluid down two lines at equal flow rates, the same movement of fluid down the left-hand and right-hand lines 42 and 43 could also be achieved in other ways, for instance by a single gang pump delivering fluid past a flow divider.

What is claimed:

1. A hydraulic control circuit for a CVT including a first ratio-varying component (1,2,5,6,9) of variable orientation, and at least one second engagable component (25,26) having variable capacity to transmit torque when engaged and in which:
   a hydraulic ram means comprises a piston (35) movable over a predetermined stroke within a cylinder (38,39), and the piston is connectable in use to the first ratio-varying component (6) so that the location of the piston within its stroke reflects the orientation of the first component, and the cylinder includes inlet (44,45) and outlet (52,53) ports for hydraulic fluid;
   the outlet is arranged within the cylinder so as to be restricted when the piston overshoots its predetermined stroke, so raising circuit pressure upstream of the ram means, and
   control means (56,57) are responsive to that raised upstream circuit pressure and operable, in use of the CVT, to reduce the torque-transmitting capacity of the said second component.

2. A hydraulic control circuit according to claim 1 in which the control means also includes a control valve operable, when the piston is within its predetermined stroke, to regulate fluid flow through the ram means so that the piston is controlled to take up its desired location within its stroke.

3. A hydraulic control circuit according to claim 1 in which the ram means comprises a double-ended ram carrying opposed first (36) and second (37) pistons at its opposite ends, the two pistons being movable within respective first and second cylinders each having respective inlet and outlet ports.

4. A hydraulic control circuit according to claim 3 in which the first and second cylinders are connected into parallel first (42,54) and second (43,55) hydraulic circuits respectively, and in which means (49,50,58) are provided to sense the higher of the two circuit pressures upstream of the two cylinder inlets and to apply that pressure to the control means to regulate them.

5. A hydraulic control circuit according to claim 4 in which means (61,62,68) are provided to sense the higher of the two circuit pressures downstream of the two cylinder outlets, and to apply that pressure to the said second component to enable that component to transmit torque.

6. A hydraulic control circuit according to claim 5 in which the control means are operable to reduce the said pressure applied to the said second component.

7. A CVT of the toroidal-race rolling-traction type, in which hydraulic end loading means (1,13,14,15) maintain the appropriate torque-transmitting contact between rollers and discs, which includes a hydraulic control circuit according to claim 4, and in which the higher of the two circuit pressures upstream of the two cylinder inlets is applied also to the hydraulic end loading means.

8. A CVT of multi-regime type, including a hydraulic control circuit according to claim 1, in which at least one regime is engaged by the operation of the said second engagable component (25).

* * * * *